(12) United States Patent
Leung

(10) Patent No.: US 8,493,919 B2
(45) Date of Patent: Jul. 23, 2013

(54) INTERFERENCE MITIGATION IN A WIRELESS COMMUNICATION SYSTEM

(75) Inventor: Gilbert Leung, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 905 days.

(21) Appl. No.: 11/859,072

(22) Filed: Sep. 21, 2007

(65) Prior Publication Data

US 2009/0080384 A1 Mar. 26, 2009

(51) Int. Cl.
*H04W 4/00* (2009.01)
*H04J 3/00* (2006.01)

(52) U.S. Cl.
USPC .......................................... 370/329; 370/336

(58) Field of Classification Search
USPC .................................. 370/329, 330, 336, 337
See application file for complete search history.

(56) References Cited

U.S. PATENT DOCUMENTS

| | | | |
|---|---|---|---|
| 5,896,375 A | 4/1999 | Dent et al. | |
| 6,496,531 B1 * | 12/2002 | Kamel et al. | 375/130 |
| 6,606,496 B1 * | 8/2003 | Salvarani et al. | 455/436 |
| 6,801,512 B1 * | 10/2004 | Cudak et al. | 370/332 |
| 6,804,521 B2 * | 10/2004 | Tong et al. | 455/450 |
| 6,970,708 B1 * | 11/2005 | Raith | 455/440 |
| 7,130,635 B2 | 10/2006 | Cerwall et al. | |
| 7,239,622 B2 * | 7/2007 | Black | 370/338 |
| 7,746,816 B2 * | 6/2010 | Attar et al. | 370/318 |
| 8,077,692 B2 * | 12/2011 | Khandekar et al. | 370/344 |
| 8,194,598 B2 * | 6/2012 | Attar et al. | 370/329 |
| 2002/0147011 A1 * | 10/2002 | Kay | 455/427 |
| 2002/0154621 A1 * | 10/2002 | Laroia et al. | 370/347 |
| 2004/0047328 A1 * | 3/2004 | Proctor et al. | 370/342 |
| 2004/0057398 A1 * | 3/2004 | Black | 370/321 |
| 2004/0157646 A1 * | 8/2004 | Raleigh et al. | 455/562.1 |
| 2005/0047393 A1 * | 3/2005 | Liu | 370/352 |
| 2006/0019694 A1 * | 1/2006 | Sutivong et al. | 455/522 |
| 2006/0039315 A1 * | 2/2006 | Bi et al. | 370/328 |
| 2006/0212133 A1 * | 9/2006 | Damnjanovic et al. | 700/1 |

(Continued)

FOREIGN PATENT DOCUMENTS

| | | |
|---|---|---|
| EP | 1811689 | 7/2007 |
| JP | 2004527950 A | 9/2004 |

(Continued)

OTHER PUBLICATIONS

International Search Report, PCT/US2008/077177—International Search Authority—European Patent Office, Mar. 27, 2009.

(Continued)

*Primary Examiner* — Farah Faroul
(74) *Attorney, Agent, or Firm* — D. Scott Juneau

(57) ABSTRACT

Techniques for mitigating interference on the reverse link in a wireless communication system are described. Terminals interfering with one another and communicating with different sectors on the reverse link may be identified. The terminals may be scheduled in time intervals selected to mitigate interference. For example, each terminal may be scheduled on at least one pseudo-randomly selected time interval, on a pseudo-randomly selected interlace that includes evenly spaced time intervals, on a different set of at least one time interval, on a different interlace, etc. A terminal may receive an assignment of at least one time interval for transmission on the reverse link to a serving sector. The at least one time interval may be selected to mitigate interference to terminals in neighbor sectors.

29 Claims, 6 Drawing Sheets

U.S. PATENT DOCUMENTS

| | | | |
|---|---|---|---|
| 2007/0004423 A1* | 1/2007 | Gerlach et al. | 455/452.2 |
| 2007/0104085 A1* | 5/2007 | Sambhwani et al. | 370/203 |
| 2007/0111746 A1* | 5/2007 | Anderson | 455/522 |
| 2007/0177631 A1* | 8/2007 | Popovic et al. | 370/478 |
| 2008/0057934 A1* | 3/2008 | Sung et al. | 455/422.1 |
| 2008/0102822 A1* | 5/2008 | Feng et al. | 455/425 |
| 2008/0188256 A1* | 8/2008 | Wu et al. | 455/522 |
| 2008/0268859 A1* | 10/2008 | Lee et al. | 455/450 |
| 2008/0298387 A1* | 12/2008 | Lohr et al. | 370/467 |
| 2009/0016223 A1* | 1/2009 | Kim et al. | 370/236.1 |
| 2009/0023466 A1* | 1/2009 | Sutivong et al. | 455/522 |
| 2009/0073939 A1* | 3/2009 | Panico | 370/335 |
| 2009/0088176 A1* | 4/2009 | Teo et al. | 455/452.1 |
| 2010/0273502 A1* | 10/2010 | Uemura et al. | 455/452.2 |
| 2012/0140690 A1* | 6/2012 | Choi et al. | 370/311 |

FOREIGN PATENT DOCUMENTS

| | | |
|---|---|---|
| JP | 2005500764 A | 1/2005 |
| JP | 2006500822 A | 1/2006 |
| JP | 2006352859 A | 12/2006 |
| WO | 9949587 | 9/1999 |
| WO | WO02075963 A2 | 9/2002 |
| WO | WO03017696 A1 | 2/2003 |
| WO | WO2005112485 A2 | 11/2005 |
| WO | WO2005125262 | 12/2005 |
| WO | WO2006085353 A1 | 8/2006 |
| WO | 2008099548 | 9/2006 |

OTHER PUBLICATIONS

Written Opnion. PCT/US200/077177—International Search Authority—European Patent Office, Mar. 27, 2009.

EE624 Mobile Communications Systems (MCS) in: Fundamentals of Cellular Communications, Communication Networks Research Lab, (Fall 2000).

EE624 Mobile Communications Systems (MCS) in: Physical Layer of CDMA, Communication Networks Research Lab, (Fall 2000).

* cited by examiner

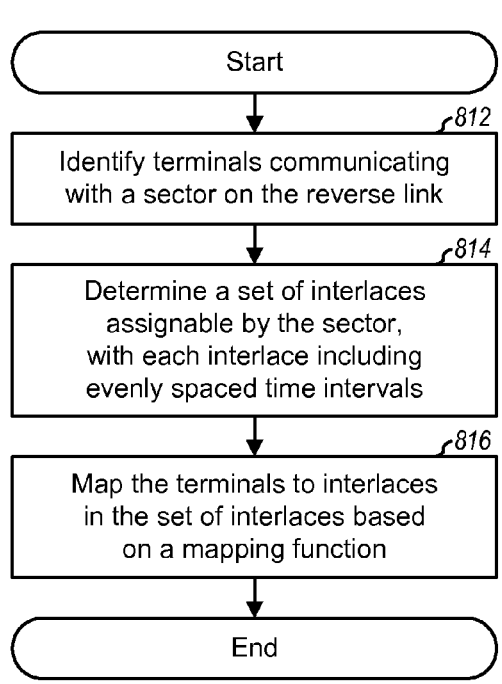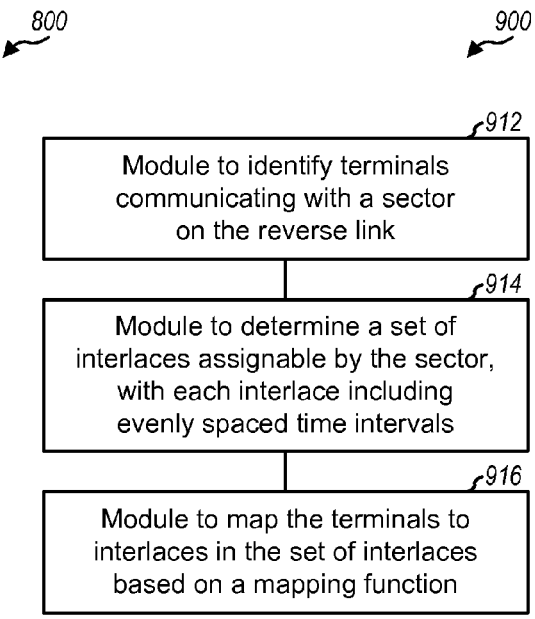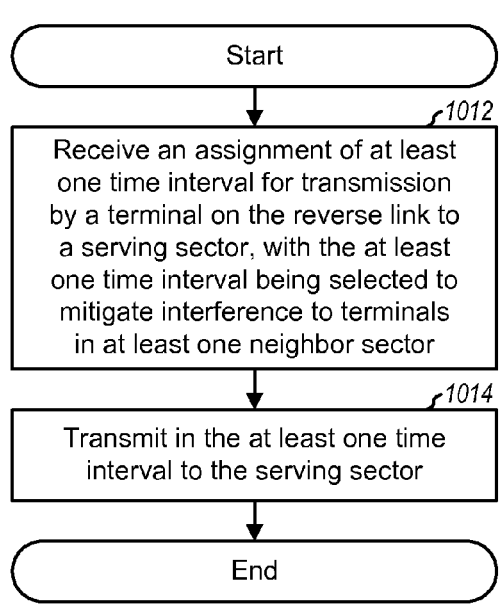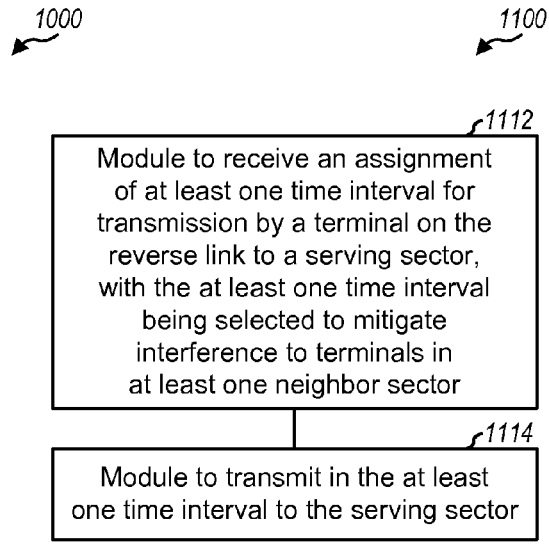
FIG. 8
FIG. 9
FIG. 10
FIG. 11

INTERFERENCE MITIGATION IN A WIRELESS COMMUNICATION SYSTEM

BACKGROUND

I. Field

The present disclosure relates generally to communication, and more specifically to techniques for combating interference in a wireless communication system.

II. Background

A wireless multiple-access system can support communication for multiple terminals on the forward and reverse links. The forward link (or downlink) refers to the communication link from the base stations to the terminals, and the reverse link (or uplink) refers to the communication link from the terminals to the base stations. Multiple terminals may simultaneously transmit data on the reverse link and/or receive data on the forward link. This may be achieved by multiplexing the transmissions on each link to be orthogonal to one another in time, frequency, and/or code domain. The orthogonality ensures that the transmission for each terminal minimally interfere with the transmissions for other terminals.

A wireless communication system may have many sectors, where the term "sector" can refer to a base station and/or its coverage area depending on the context in which the term is used. On the reverse link, the transmissions from terminals in the same sector may be orthogonally multiplexed to avoid interfering with one another. However, the transmissions from terminals in different sectors may not be orthogonal, in which case each terminal may cause interference to terminals in other sectors. The inter-sector interference may significantly degrade performance for disadvantaged terminals observing high levels of interference.

To combat inter-sector interference, a wireless communication system may employ a frequency reuse scheme whereby not all frequency channels available in the system are used in each sector. For example, a system may employ a 7-sector reuse pattern and a frequency reuse factor of 7. In this system, the overall system bandwidth may be divided into seven non-overlapping frequency channels, and each sector in a 7-sector cluster may be assigned one of the seven frequency channels. Each sector uses only one frequency channel, and every seventh sector reuses the same frequency channel. With this frequency reuse scheme, each frequency channel is only reused in sectors that are not adjacent to each other, and the inter-sector interference observed in each sector is reduced relative to the case in which all sectors use the same frequency channel. However, a large frequency reuse factor (e.g., two or more) represents inefficient use of the available system resources since each sector is able to use only a fraction of the overall system bandwidth.

There is therefore a need in the art for techniques to combat interference in a more efficient manner.

SUMMARY

Techniques for mitigating interference on the reverse link in a wireless communication system are described herein. Interference mitigation refers to potentially lessening the adverse effects due to interference. In one design for scheduling terminals on the reverse link, terminals interfering with one another and communicating with different sectors on the reverse link may be identified. The terminals may be scheduled in time intervals selected to mitigate interference. For example, each terminal may be scheduled on at least one pseudo-randomly selected time interval from an allowed set of time intervals, on a pseudo-randomly selected frame interlace that includes evenly spaced time intervals, on a different set of at least one time interval, on a different frame interlace, etc.

A terminal may receive an assignment of at least one time interval for transmission on the reverse link to a serving sector. The at least one time interval may be selected to mitigate interference to terminals in at least one neighbor sector. The terminal may transmit in the at least one time interval to the serving sector.

Various aspects and features of the disclosure are described in further detail below.

BRIEF DESCRIPTION OF THE DRAWINGS

FIG. 8 shows yet another process for scheduling terminals on the reverse link.

FIG. 9 shows yet another apparatus for scheduling terminals on the reverse link.

FIG. 10 shows a process for transmission on the reverse link.

FIG. 11 shows an apparatus for transmission on the reverse link.

DETAILED DESCRIPTION

Figure 1:
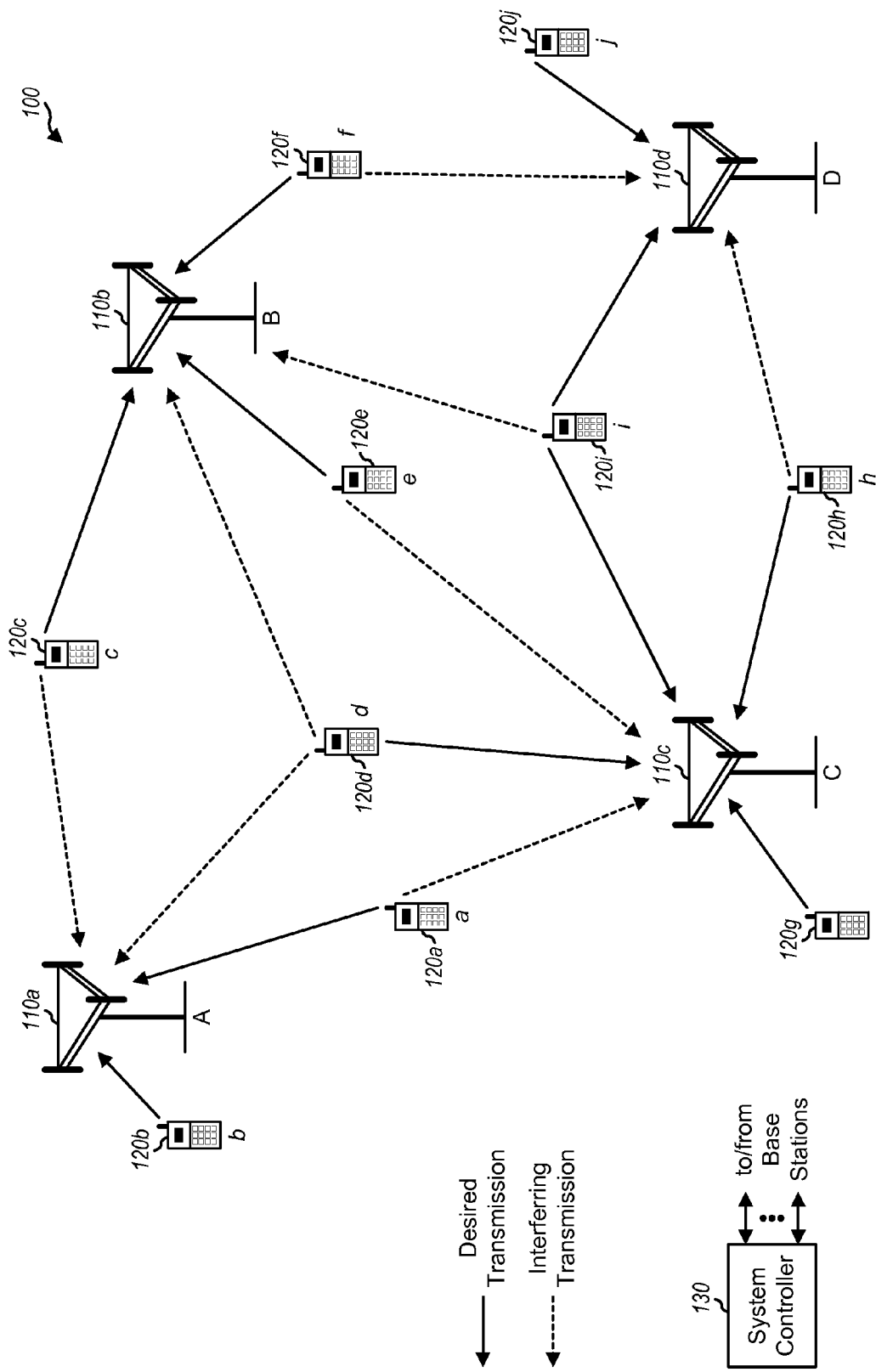
FIG. 1 shows a wireless communication system.

FIG. 1 shows a wireless communication system 100 with multiple base stations 110 and multiple terminals 120. A base station is a station that communicates with the terminals. A base station may also be called, and may contain some or all of the functionality of, an access point, a Node B, an evolved Node B, etc. Each base station 110 provides communication coverage for a particular geographic area. The term "cell" may refer to a base station and/or its coverage area depending on the context in which the term is used. To improve system capacity, a base station coverage area may be partitioned into multiple smaller areas, e.g., three smaller areas. Each smaller area may be served by a respective base transceiver station (BTS). The term "sector" may refer to a BTS and/or its coverage area depending on the context in which the term is used. For a sectorized cell, the BTSs for all sectors of that cell are typically co-located within the base station for the cell.

Terminals 120 may be dispersed throughout the system, and each terminal may be stationary or mobile. A terminal may also be called, and may contain some or all of the functionality of, an access terminal, a mobile station, a user equipment, a subscriber unit, a station, etc. A terminal may be a wireless device, a cellular phone, a personal digital assistant (PDA), a wireless modem, a handheld device, a laptop computer, a cordless phone, etc. A terminal may communicate with zero, one, or multiple base stations on the forward and/or reverse links at any given moment.

For a centralized architecture, a system controller 130 may couple to base stations 110 and provide coordination and control for these base stations. System controller 130 may be a single network entity or a collection of network entities. For a distributed architecture, the base stations may communicate with one another via a backhaul as needed, e.g., to exchange information for terminals, to schedule terminals, to coordinate usage of system resources, etc.

The techniques described herein may be used for various wireless communication systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc. An OFDMA system utilizes orthogonal frequency division multiplexing (OFDM). An SC-FDMA system utilizes single-carrier frequency division multiplexing (SC-FDM). OFDM and SC-FDM partition the system bandwidth into multiple orthogonal subcarriers, which are also referred to as tones, frequency bins, etc. Each subcarrier may be modulated with data. In general, modulation symbols are sent in the frequency domain with OFDM and in the time domain with SC-FDM. The techniques may also be used for wireless communication systems that utilize multiple multiplexing schemes, e.g., CDMA and OFDM, OFDM and SC-FDM, etc.

The techniques described herein may also be used for systems with sectorized cells as well as systems with un-sectorized cells. For clarity, the techniques are described below for a system with sectorized cells. In the following description, the terms "base station", "access point", and "sector" are used interchangeably, and the terms "user", "access terminal", and "terminal" are also used interchangeably.

As shown in FIG. 1, the transmission from each terminal may be received by one or more sectors. The transmission from a given terminal may be considered as (1) a desired transmission at a sector designated to receive the transmission and (2) an undesired or interfering transmission to other sectors not designated to receive the transmission. For each sector, the interfering transmissions from the terminals in other sectors may degrade the performance of the transmissions from the terminals in that sector.

Each terminal u may be associated with the following sets of cells shown in Table 1.

TABLE 1

Sets for a Terminal u

| Set | Symbol | Description |
| --- | --- | --- |
| Serving set | S(u) | Include the sector designated to receive terminal u. |
| Active set | A(u) | Include all sectors in active communication with terminal u. |
| Candidate set | C(u) | Include all sectors that can detect terminal u because its signal arrives at these sectors at sufficient signal strength. |

Terminal u may have a serving sector $S_u$, which may be selected by terminal u or sector $S_u$. Serving set S(u) typically includes only serving sector $S_u$, e.g., until terminal u moves out of range of sector $S_u$, or is handed off to another sector, or is unacquired in some other way. Active set A(u) includes serving set S(u) (and thus, serving sector $S_u$) as well as other sectors in active communication with terminal u, which may be added via some kind of signaling exchanged between each additional sector and terminal u. In one design, active set A(u) is maintained by terminal u. In this design, each sector in active set A(u) may not know which other sectors are included in the active set. In another design, active set A(u) may be sent to serving sector S, via signaling, and the active set information for terminal u may be forwarded via the backhaul to other sectors, including but not limited to the non-serving sectors in active set A(u).

Candidate set C(u) includes the sectors in active set A(u) as well as other sectors that can detect terminal u because its signal arrives at these other sectors at sufficient signal strength. Typically, a terminal situated near the boundaries among sectors would include these nearby sectors in the terminal's candidate set. The terminal may not be actively communicating with these sectors but may cause significant interference to them when its transmission is not controlled. A terminal may also be able to reciprocally detect a sector in its candidate set because the sector is within its proximity (in the sense of RF). Candidate set C(u) is a superset of active set A(u), so that C(u) includes A(u). Sectors may be added to or removed from candidate set C(u) based on signal strength measurements made by the sectors and/or terminal u. Candidate set C(u) may be determined and updated in various manners. In one design, a given sector S may be added to candidate set C(u) of terminal u if the measured signal strength for terminal u exceeds an add threshold. Each sector may periodically make measurements to determine which terminals are within its proximity, and thus are detected by the sector. Each sector may notify terminals that are received at sufficient signal strength by that sector. Each terminal may update its candidate set based on notifications received from all sectors that can detect that terminal. In another design, each terminal may measure the signal strength of each sector that can be received by that terminal. Each terminal may add each sector that can be received at sufficient signal strength by that terminal to candidate set C(u). In any case, the sectors in candidate set C(u) may be candidates for serving terminal u or for communication with terminal u on the reverse link.

Each sector S may be associated with the following sets of terminals shown in Table 2.

TABLE 2

Sets for a Sector S

| Set | Symbol | Description |
| --- | --- | --- |
| User set | U(S) | Include terminals in active communication with sector S. |
| Detected set | D(S) | Include terminals that can be received by sector S at sufficient signal strength. |
| Interfering set | I(S) | Include terminals detected by sector S but not in communication with sector S. |

User set U(S) may include all terminals having sector S in their active sets, or U(S)={u:S∈A(u)}. If each terminal communicates with only its serving sector, then user set U(S) may include all terminals having sector S in their serving sets, or U(S)={u:S∈S(u)}. Detected set D(S) may include all terminals having sector S in their candidate sets, or D(S) {u:S∈C(u)}. Detected set D(S) for sector S may contain terminals that are received at sufficient signal strength by sector S. Each sector may periodically make signal strength measurements to ascertain which terminals are detectable by that sector. Each sector may update its detected set based on the signal strength measurements. Detected set D(S) may include user set U(S), just as candidate set C(u) may include active set A(u). Interfering set I(S) may include all terminals in detected set D(S) that are not in user set U(S), or I(S)=D(S)\U(S) and D(S)=U(S)∪I(S), where "\" denotes the set difference operation and "∪" denotes the set union operation.

In the example shown in FIG. 1, base stations 110a through 110d are referred to as sectors A through D, respectively. Terminals 120a through 120j are referred to as terminals a through j, respectively. For each terminal, a solid line with an arrow at one end represents transmission to a serving sector or a sector in the active set. A dashed line with an arrow at one end represents transmission that is received at sufficient signal strength at a sector. The active set for each terminal may include all sectors pointed to by solid lines from that terminal. The serving set for each terminal may include one sector in the active set. The candidate set for each terminal may include all sectors pointed to by solid and dashed lines from that terminal. As an example, for terminal i, the serving set includes sector D, the active set includes sectors C and D, and the candidate set includes sectors B, C and D.

The serving set, active set, and candidate set for each terminal in FIG. 1 may be given as follows:

$$S(a)=\{A\}, A(a)=\{A\}, C(a)=\{A,C\},$$

$$S(b)=\{A\}, A(b)=\{A, C(b)=A\},$$

$$S(c)=\{B\}, A(c)=\{B\}, C(c)=\{A,B\},$$

$$S(d)=\{C\}, A(d)=\{C\}, C(d)=\{A,B,C\},$$

$$S(e)=\{B\}, A(e)=\{B\}, C(e)=\{B,C\},$$

$$S(f)=\{B\}, A(f)=\{B\}, C(f)=\{B,D\},$$

$$S(g)=\{C\}, A(g)=\{C\}, C(g)=\{C\},$$

$$S(h)=\{C\}, A(h)=\{C\}, C(h)=\{C,D\},$$

$$S(i)=\{D\}, A(i)=\{C,D\}, C(i)=\{B,C,D\}, \text{ and}$$

$$S(j)=\{D\}, A(j)=\{D\}, C(j)=\{D\}. \quad \text{Eq (1)}$$

The user set for each sector may include all terminals with solid lines pointing to that sector. The interfering set for each sector may include all terminals with broken lines pointing to that sector. The detected set for each sector may include all terminals with solid or broken lines pointing to that sector. As an example, for sector C, the user set includes terminals d, g, h and i, the detected set includes terminals a, d, e, g, h and i, and the interfering set includes terminal a and e.

The user set, interfering set, and detected set for each sector in FIG. 1 may be given as follows:

$$U(A)=\{a,b\}, I(A)=\{c,d\}, D(A)=\{a,b,c,d\},$$

$$U(B)=\{c,e,f\}, I(B)=\{d,i\}, D(B)=\{c,d,e,f,i\},$$

$$U(C)=\{d,g,h,i\}, I(C)=\{a,e\}, D(C)=\{a,d,e,g,h,i\}, \text{ and}$$

$$U(D)=\{i,j\}, I(D)=\{f,h\}, D(D)=\{f,h,i,j\}. \quad \text{Eq (2)}$$

The sets in Tables 1 and 2 may be used to facilitate interference mitigation and/or for other purposes. In the description below, each terminal u may be identified by a terminal identifier (Terminal_ID) whenever necessary. Similarly, each sector S may be identified by a sector identifier (Sector_ID) whenever necessary.

Interference may be mitigated as follows:
Identify terminals that may interfere with one another, and
Schedule these terminals to reduce the likelihood of simultaneous transmission by these terminals.

Terminals that may interfere with one another may be identified in various manners. In one design, terminals that may interfere with one another are identified based on the candidate sets. Each terminal may report its candidate set to its serving sector and possibly to other sectors in the candidate set, e.g., via over-the-air signaling. Each sector may receive the candidate sets for the terminals served by that sector. Each sector may send the candidate sets for its terminals to neighbor sectors, e.g., via the backhaul. Each sector may also receive the candidate sets for terminals served by the neighbor sectors, e.g., from these terminals directly via over-the-air signaling or from the neighbor sectors via the backhaul. In any case, the candidate set information may be sent periodically, or updated in predetermined times provided that there are changes to the candidate sets. Each sector may have candidate set information for the terminals served by that sector as well as for the terminals served by the neighbor sectors. Each sector may use the candidate set information to identify interfering terminals and to schedule its terminals.

A terminal u may interfere with other terminals at a given sector S if these terminals are served by sector S and sector S is not the serving sector of terminal u but is in the candidate set of terminal u. In the example shown in FIG. 1, terminal a has candidate set C(a)={A, C}, terminal b has candidate set C(b)={A}, terminal c has candidate set C(c)={A, B}, and terminal d has candidate set C(d)={A, B, C}. These terminals may interfere with one another at sector A. Similarly, terminals c, d, e, f and i may interfere with one another at sector B, terminals a, d, e, g, h and i may interfere with one another at sector C, and terminals f, h, i and j may interfere with one another at sector D. For each sector, terminals in other sectors may cause inter-sector interfere to the local terminals in that sector. In the example shown in FIG. 2, terminals a and b are local terminals in sector A, and terminals c and d are interfering terminals to sector A. For each sector, the terminals that may interfere with one another at that sector may be scheduled such that interference may be mitigated. In sector A, terminal a may be scheduled to avoid terminals c and d. Terminal b has only one sector A in its candidate set and may be scheduled without regard to other terminals.

In another design, terminals that may interfere with one another are identified based on one or more sets maintained by the sectors. Each sector may send its user set, interfering set, and/or detected set to the neighbor sectors, e.g., via the backhaul. Each sector may receive the sets for the neighbor sectors and may use this information to identify interfering terminals and to schedule the terminals served by that sector.

Two terminals may interfere with one another if they belong in the same detected set. In the example shown in FIG. 1, sector A has detected set D(A)={a, b, c, d}, and terminals a, b, c, d may interfere with one another at sector A. Terminals a and b are in user set U(A) for sector A and may cause intra-sector interference at sector A. Terminals c and d are not in user set U(A) and may cause inter-sector interference at sector A. Sector B has detected set D(B)={c, d, e, f, i}, and terminals c, d, e, f and i may interfere with one another at sector B. Sector C has detected set D(C)={a, d, e, g, h, i}, and terminals a, d, e, g, h and i may interfere with one another at sector C. Sector D has detected set D(D)={f, h, i, j}, and terminals f, h, i and j may interfere with one another at sector D. For each sector, the terminals that can interfere with one another may be scheduled such that interference may be mitigated.

A terminal may cause inter-sector interference if that terminal appears in an interfering set of another sector. For example, terminal a appears in interfering set I(C) for sector C and may thus cause inter-sector interference at sector C. Each sector may use the interfering sets of the neighbor sectors to identify interfering terminals and to schedule the terminals served by that sector.

Various types of information that may be used to identify terminals that may interfere with one another have been described above. These terminals may also be identified based on other types of information.

The terminals that may interfere with one another at a given sector S may include the terminals served by sector S as well as the terminals served by other sectors. The terminals served by sector S may cause intra-sector interference to one another. The terminals served by other sectors may cause inter-sector interference to the terminals served by sector S. The terminals causing high inter-sector interference are typically located at sector edges.

Intra-sector interference among terminals within the same sector may be mitigated via proper scheduling of these terminals by the sector. The terminals in each sector may be orthogonalized (1) in the frequency domain by assignment of different subcarriers, e.g., in an OFDMA or SC-FDMA system, (2) in the code domain by assignment of different orthogonal codes, e.g., in a CDMA system, and/or (3) in the time domain by assignment of different time intervals, e.g., in a TDMA system. When such orthogonalization is not effective, e.g., as in a multipath channel destroying the code orthogonality of any CDMA systems, there will be intra-sector interference, caused especially by a strong user's transmission interfering with a weaker user's transmission. The description herein assumes that intra-sector interference, if any, will be actively managed by the sector with cooperation of the terminals in the sector, or mitigated via signal processing methods (e.g. equalization) at the receiver.

Inter-sector interference among terminals in different sectors may be mitigated in different manners depending on the system design. For example, in OFDMA and SC-FDMA systems that utilize frequency hopping, the transmission from each terminal may hop from subcarrier to subcarrier based on a pseudo-random hopping pattern to achieve frequency diversity, interference averaging, and other benefits. Adjacent sectors may use different hopping patterns, and the transmissions from terminals in these sectors may then collide in frequency in a pseudo-random manner, which may mitigate inter-sector interference.

In one design, terminals that may cause inter-sector interfere may be orthogonalized in the time domain by assignment of different time intervals. The time intervals may be defined and selected in various manners. To facilitate scheduling, the time intervals may be defined based on a frame structure.

Figure 2:
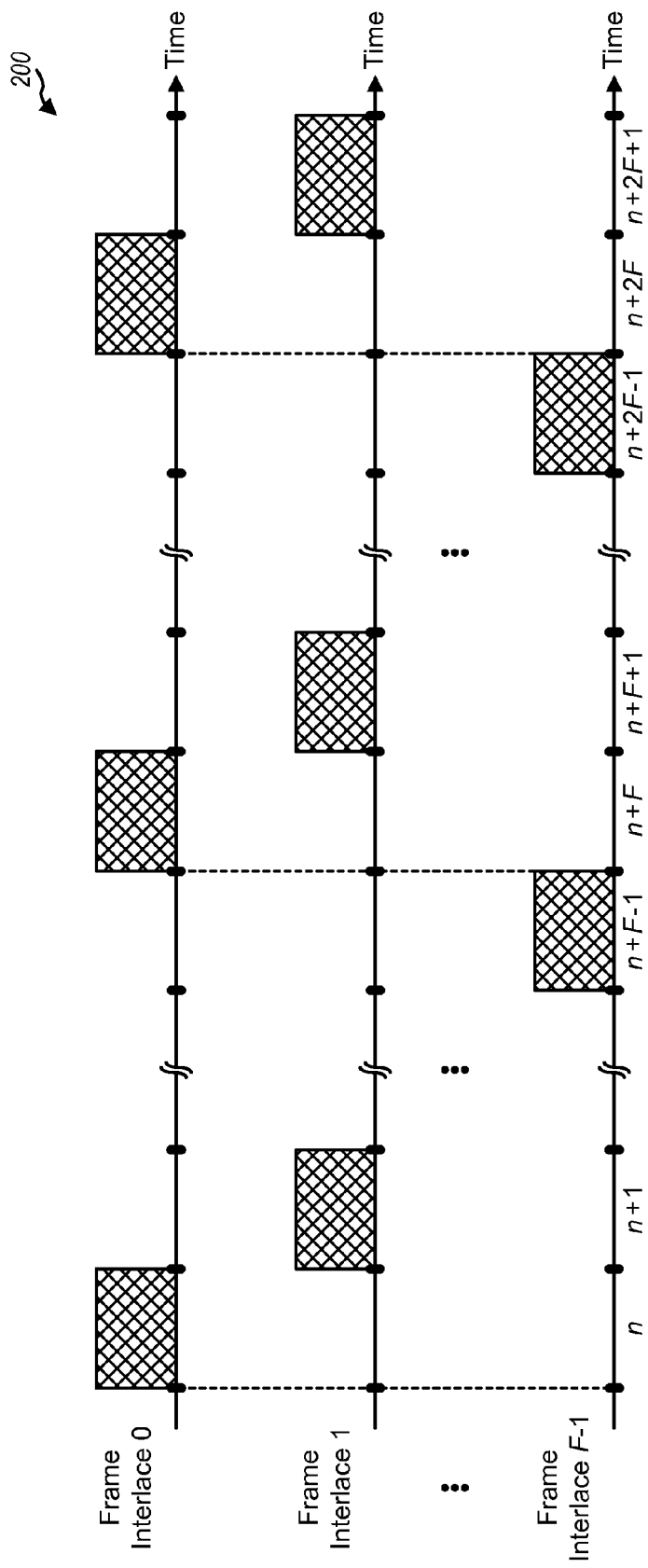
FIG. 2 shows a design of a frame structure.

FIG. 2 shows a design of a frame structure 200 that may be used for transmission on the reverse link. The transmission timeline may be partitioned into frames. Each frame may have a fixed or configurable duration and may be identified by a frame number. Multiple (F) frame interlaces with indices of 0 through F−1 may be formed. Each frame interlace may include frames that are spaced apart by F frames. For example, frame interlace 0 may include frames 0, F, 2F, etc., and in general, frames nF for n=0, 1, . . . , etc. Frame interlace 1 may include frames 1, 1+F, etc., and in general, frames 1+nF for n=0, 1, . . . , etc. The F frame interlaces may be offset from one another by one frame. For example, if F=2, then frame interlace 0 may include even-numbered frames, and frame interlace 1 may include odd-numbered frames.

The system may employ a hybrid automatic repeat request (H-ARQ) transmission scheme. With H-ARQ, a transmitter sends one or more transmissions for a packet until the packet is decoded correctly by a receiver or the maximum number of transmissions has been sent. Multiple (Q) H-ARQ interlaces may be formed, and each H-ARQ interlace may include frames that are spaced apart by Q frames, similar to the frame interlaces. The transmitter may process (e.g., encode and modulate) a packet and generate multiple data blocks. The transmitter may then send the data blocks, one block at a time, on an H-ARQ interlace until the packet is terminated. Up to Q packets may be sent in parallel on the Q H-ARQ interlaces.

In one design, the frame interlaces in FIG. 2 correspond to the H-ARQ interlaces used for H-ARQ transmission and thus F=Q. In another design, F=M Q frame interlaces are formed, with each frame interlace including every M-th frame of an H-ARQ interlace. In general, the frame interlaces may or may not be related to the H-ARQ interlaces.

The F frame interlaces are orthogonal, since the frames are partitioned into F distinct sets such that no frame is included in more than one frame interlace. The frames in each frame interlace may be uniformly spaced over time (e.g., as shown in FIG. 2) or may be non-uniformly distributed over time.

The terminals that may cause inter-sector interfere may be scheduled in different frame interlaces to mitigate interference via orthogonality in the time domain. These terminals may also be scheduled in pseudo-randomly selected frame interlaces to mitigate interference via randomization of collisions. The scheduling of the terminals may be performed in various manners. In one design, decentralized scheduling is performed. In this design, each sector may schedule the terminals served by that sector without regard to the scheduling by other sectors. In another design, coordinated scheduling is performed. In this design, each sector may receive information for terminals served by that sector as well as information for terminals served by the neighbor sectors. Each sector may identify terminals that may cause inter-sector interference to other sectors and may schedule these terminals to mitigate interference.

Similar to scheduling, interference mitigation schemes may be classified as decentralized schemes or coordinated schemes. For a decentralized scheme, no information may be exchanged between the sectors regarding the various sets maintained by each sector or each terminal. For a coordinated scheme, some information may be exchanged between the sectors via the backhaul, e.g., information on user set U(S) and interfering set I(S) maintained by each sector. Some example schemes for interference mitigation are described below.

In one design of a decentralized scheme, a given terminal u is assigned a frame interlace based solely on that terminal's ID, as follows:

$$f_u = h(u). \qquad \text{Eq (3)}$$

where $f_u$ is a frame interlace assigned to terminal u for the reverse link, and h( ) is a mapping function.

The mapping function may be a hash function that maps one or more input parameters to an output value. In the design shown in equation (3), the input parameter includes only the Terminal_ID of terminal u. For simplicity, the symbol u is used to represent both the terminal itself and its Terminal_ID. The Terminal_ID may be given by a Medium Access Control identifier (MACID), an Internet Protocol (IP) address, etc. The output value from the hash function indicates a specific frame interlace to assign to terminal u.

In another design of a decentralized scheme, terminal u is assigned a frame interlace between 0 through F−1 based on the terminal's ID and the serving sector's ID, as follows:

$$f_u = h(u, S). \qquad \text{Eq (4)}$$

In the design shown in equation (4), the input parameters include the Terminal_ID of terminal u and the Sector_ID of the serving sector for terminal u.

In general, a mapping function may have any number of input parameters, and each input parameter may be for any information. The same mapping function (e.g., same hash function) may be used by all sectors. In this case, even though the sectors independently schedule their terminals, each sector may be able to ascertain the frame interlaces for managing interfering terminals in neighbor sectors without having to explicitly signal messages among the sectors.

Each sector may have a set of allowed frame interlaces that may be assigned to the terminals served by that sector. The allowed frame interlaces for sector S may be denoted as H(S). In one design, all of the F frame interlaces are available to each sector, and set H(S) includes frame interlaces 0 through F−1, or $H(S)=H=\{0, 1, \ldots, F-1\}$. The mapping function in equation (3) or (4) may map terminal u to a frame interlace between 0 to F−1, so that $f_u \in H$. The designs in equations (3) and (4) achieve interference mitigation by distributing interfering terminals to mostly different frame interlaces via the pseudo-random mappings h( ).

The number of frame interlaces available to sector S may be a function of sector S and may be denoted as F(S). For each sector, F(S) may be equal to F or may be less than F. F(S) may be different for different sectors. Alternatively or additionally, the set of frame interlaces H(S) available to sector S may be a function of sector S. For each sector, H(S) may include all F frame interlaces or a subset of these frame interlaces. H(S) may be different for different sectors. For example, different sectors may have the same number of frame interlaces but different subsets of the F frame interlaces. In any case, the mapping function for each sector may be dependent on sector S.

In yet another design of a decentralized scheme, terminal u is assigned a frame interlace based on the terminal's ID and a mapping function for the serving sector for terminal u, as follows:

$$f_u = h_s(u), \quad \text{Eq (5)}$$

where $h_s( )$ is a mapping function for sector S and $f_u \in H(S)$. Mapping function $h_s(u)$ maps the Terminal_ID of terminal u to a frame interlace in set H(S) for the serving sector of terminal u.

In general, terminal u may be assigned one or more frame interlaces in set H(S) by the serving sector. The number of frame interlaces assigned to terminal u may be dependent on the loading level of the serving sector, power headroom of terminal u (e.g., as reported by terminal u to the serving sector via signaling or some other means), and/or other factors. In one design, multiple mapping functions may be used to assign multiple frame interlaces to terminal u. For example, up to $M=M_u$ frame interlaces are allowed for transmission by terminal u and in general $M \geq 1$, and may depend on other cell configuration parameters such as geometry and loading conditions.

Since one allowed frame interlace per terminal may not suffice if a terminal has a large amount of data to send, in another design, a set of extension functions may be defined and denoted as $g_1(f_u, S), g_2(f_u, S), \ldots, g_{M-1}(f_u, S)$, where $f_u$ is the baseline frame interlace and may be determined based on equation (3), (4), or (5). The extension functions may or may not be dependent on the serving sector configuration parameters, but the calculation of the output frame interlaces of these extension functions may be done independently by the given sector S and may not require any inter-sector communication via the backhaul, etc. The set of M frame interlaces assigned to terminal u may then be given as follows:

$$h(u,S)=\{f_u, g_1(f_u,S), g_2(f_u,S), \ldots, g_{M-1}(f_u,S)\}, \quad \text{Eq (6)}$$

where h(u, S) is the set of frame interlaces assigned to terminal u by sector S and $h(u,S) \subseteq H(S)$. For the case in which M=1, $h(u,S)=\{f_u\} \subseteq H(S)$. Again, M may depend on the terminal u and/or other sector configuration and loading parameters, and the sector S may use these extended frame interlaces on a need-to basis.

As an example of a decentralized scheme for the scenario shown in FIG. 1, four frame interlaces with indices of 0, 1, 2 and 3 may be available for F=4. The terminals served by sector A may be allowed to transmit in frame interlaces 0, 1 and 2. The terminals served by sector B may be allowed to transmit in frame interlaces 1, 2 and 3. The terminals served by sector C may be allowed to transmit in frame interlaces 0, 2 and 3. The terminals served by sector D may be allowed to transmit in frame interlaces 0, 1 and 3. The four sets of frame interlaces assignable to the terminals in sectors A, B, C and D may be defined as:

$$H(A)=\{0,1,2\},$$

$$H(B)=\{1,2,3\},$$

$$H(C)=\{0,2,3\}, \text{ and}$$

$$H(D)=\{0,1,3\}. \quad \text{Eq (7)}$$

As another example of a decentralized scheme for the scenario shown in FIG. 1, five frame interlaces with indices of 0, 1, 2, 3 and 4 may be available for F=5. The four sets of frame interlaces assignable to the terminals in sectors A, B, C and D may be defined as:

$$H(A)=\{0,1,2\},$$

$$H(B)=\{1,2,3\},$$

$$H(C)=\{2,3,4\}, \text{ and}$$

$$H(D)=\{0,3,4\}. \quad \text{Eq (8)}$$

For both examples given above, terminal u in sector S may be assigned one or more frame interlaces in set H(S), so that $h(u,S) \subseteq H(S)$. The set of frame interlace(s) h(u, S) assigned to terminal u in sector S may or may not be dependent on the Terminal_ID of terminal u and may or may not be dependent on the Sector_ID of the serving sector for terminal u.

In one design of a coordinated scheme, a terminal v in interfering set I(S) of sector S is assigned one or more frame interlaces in a complement set G(S) for sector S. The terminals served by sector S may be assigned frame interlaces in set H(S). Complement set G(S) for sector S does not include any frame interlaces in set H(S). Thus, interfering terminal v is not allowed to transmit in any of the frame interlaces in set H(S). Interfering terminal v may cause inter-sector interference to more than one sector. In this case, terminal v may be assigned one or more frame interlaces that are in the complement set of each sector observing interference from terminal v.

For a coordinated scheme, each sector may know the user sets and the interfering sets of the neighbor sectors. This information may be obtained through information exchanges via the backhaul and/or communicated by the terminals. Each sector may assign frame interlaces to the terminals served by that sector using known information for the interfering sets and the frame interlaces available to the neighbor sectors.

As an example of a coordinated scheme for the scenario shown in FIG. 1, the sets of frame interlaces assignable to the terminals in sectors A, B, C and D may be defined as shown in equation set (8). The sectors may assign frame interlaces to their terminals such that interference to the neighbor sectors may be mitigated when these terminals are in the interfering sets of the neighbor sectors.

For a given terminal u, all interfering sets containing terminal u may be ascertained, and all sectors observing interference from terminal u may be determined. Terminal u may then be assigned one or more frame interlaces that are (1) in the set of frame interlaces assignable by the serving sector for terminal u and (2) not in the set of frame interlaces assignable by each sector observing interference from terminal u.

For example, terminal a is served by sector A and causes interference to sector C. For the sets of frame interlaces given in equation set (8), terminal a may be assigned frame interlace 0 and/or 1, which are in set H(A) for serving sector A but not in set H(C) for interfered sector C. As another example, terminal d is served by sector C and causes interference to sectors A and B. For the sets of frame interlaces given in equation set (8), terminal d may be assigned frame interlace 4, which is in set H(C) for serving sector C but not in set H(A) or H(B) for interfered sectors A and B.

In another design of a coordinated scheme, a given terminal u is assigned one or more frame interlaces that do not cause interference to other terminals in the neighbor sectors. Each sector may initially assign frame interlaces to the terminals in that sector based on the mapping function and set H(S) for that sector. Each sector may also ascertain the frame interlaces assigned to the terminals in the neighbor sectors, e.g., based on the user sets and the mapping functions for the neighbor sectors.

If terminal u in sector S is initially assigned the same frame interlace as another terminal v in sector R, which may observe inter-sector interference from terminal u, then the conflict may be resolved in several manners. In one design, sector S may communicate with sector R to resolve the conflict. In another design, sector S may remap terminal u to another frame interlace based on a remapping scheme. The same remapping scheme may be used by all sectors. In this case, each sector can identify conflicts and can apply the same remapping scheme used by the neighbor sectors so that the interfering terminals can be scheduled on different frame interlaces, possibly without having to send signaling via the backhaul to resolve the conflicts. The remapping scheme may also determine which terminal should be remapped whenever a conflict occurs.

For example, terminals a, b, c and d may interfere with one another at sector A in FIG. 1. Terminals a, b, c and d may be initially assigned frame interlaces $f_a$, $f_b$, $f_c$ and $f_d$, respectively, based on the mapping function. If $f_a$, $f_b$, $f_c$ and $f_d$ are different frame interlaces, then terminals a, b, c and d may transmit in these frame interlaces without interfering one another. If any combination of $f_a$, $f_b$, $f_c$ and $f_d$ is the same, then the conflict may be resolved as described above. Terminals a and b have the same serving sector A and may be assigned different sets of subcarriers or different code channels to achieve orthogonality in the frequency or code domain. Terminals a and b may be scheduled on the same frame interlace $f_y$, which may be $f_a$, $f_b$, or some other frame interlace that may be ascertained by other sectors. If $f_c$ and/or $f_d$ is the same as $f_y$, then sector A may communicate with sector B and/or C to resolve the conflict. Alternatively, sector A may remap terminals a and b to resolve the conflict.

In another design of a coordinated scheme, a central scheduler may assign frame interlaces to interfering terminals based on a group mapping function for all of these terminals, as follows:

$$\begin{bmatrix} f_a \\ f_b \\ \vdots \\ f_n \end{bmatrix} = g \begin{bmatrix} a, S_a \\ b, S_b \\ \vdots \\ n, S_n \end{bmatrix}, \quad \text{Eq (9)}$$

where $S_a$ through $S_n$ are the serving sectors for terminals a through n, respectively,
  $f_a$ through $f_n$ are the frame interlaces for terminals a through n, respectively, and
  g[ ] is a group mapping function that maps the group of terminals to different frame interlaces.

Mapping function g[ ] may be a function of Terminal_ID and Sector_ID, as shown in equation (9). Mapping function g[ ] may also be a function of only Terminal_ID or a function of some other combination of input parameters. Mapping function g[ ] may also be composed of a number of functions, rules, etc.

Figure 3:
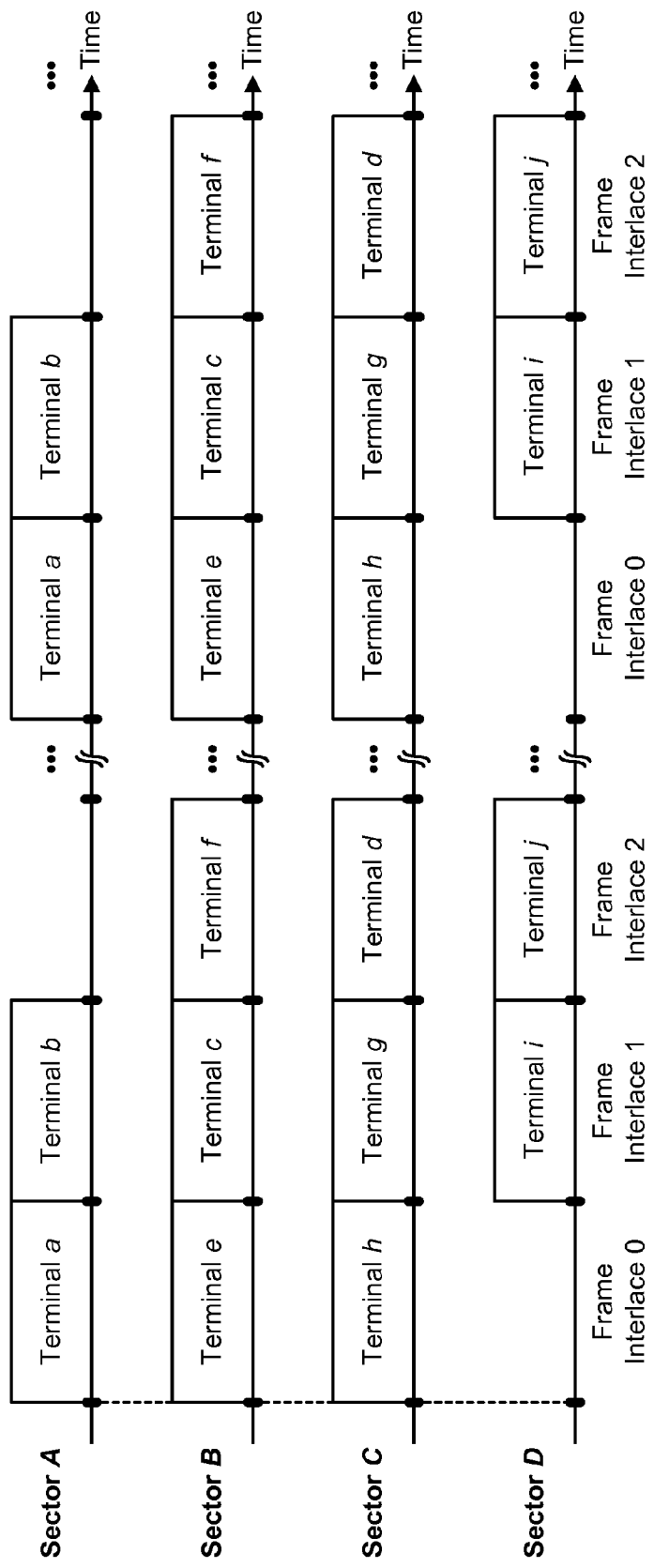
FIG. 3 shows scheduling of terminals in the four sectors in FIG. 1.

FIG. 3 shows an example of scheduling of terminals in sectors A, B, C and D in FIG. 1 such that terminals that may interfere with one another are scheduled in different frame interlaces. Sector A may schedule terminals a and b such that terminal a does not interfere with terminal d at sector C. In this example, sector A schedules terminals a and b on frame interlaces 0 and 1, respectively. Sector B may schedule terminals c, e and y such that terminal e does not interfere with terminal d at sector C and such that terminal f does not interfere with terminal i at sector D. In this example, sector B schedules terminals c, e and f on frame interlaces 1, 0 and 2, respectively. Sector C may schedule terminals d, g and h such that terminal d does not interfere with terminal a at sector A or terminal e at sector B and such that terminal h does not interfere with terminal i at sector D. In this example, sector C schedules terminals d, g and h on frame interlaces 2, 1 and 0, respectively. Sector D may schedule terminals i and j such that terminal i does not interfere with terminal h at sector C. In this example, sector D schedules terminals i and j on frame interlaces 1 and 2, respectively.

For clarity, interference mitigation have been described above using frame interlaces in the time domain. Interference mitigation may also be achieved using orthogonal codes in the code domain, subcarriers in the frequency domain, spatial channels in the spatial domain, etc.

Figure 4:
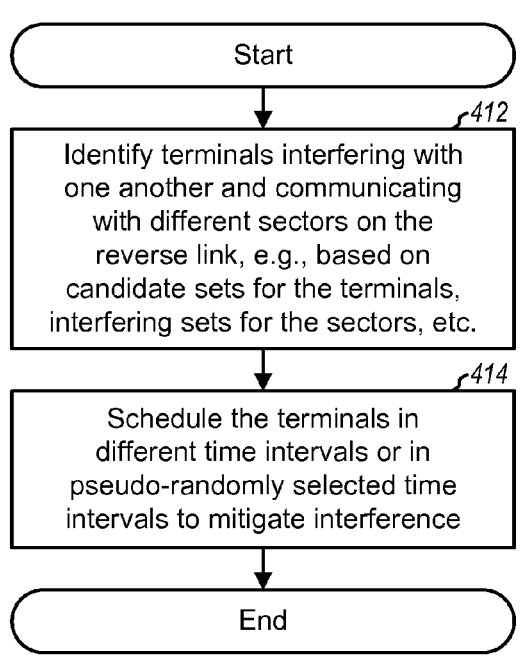
FIG. 4 shows a process for scheduling terminals on the reverse link.

FIG. 4 shows a design of a process 400 for scheduling terminals on the reverse link to mitigate interference. Terminals interfering with one another and communicating with different sectors on the reverse link may be identified, e.g., based on the candidate sets for the terminals, the interfering sets for the sectors, etc. (block 412). The terminals may be scheduled in different time intervals or in pseudo-randomly selected time intervals to mitigate interference (block 414). For example, each terminal may be scheduled on a different set of at least one time interval, on a different interlace that includes evenly spaced time intervals, etc.

Figure 5:
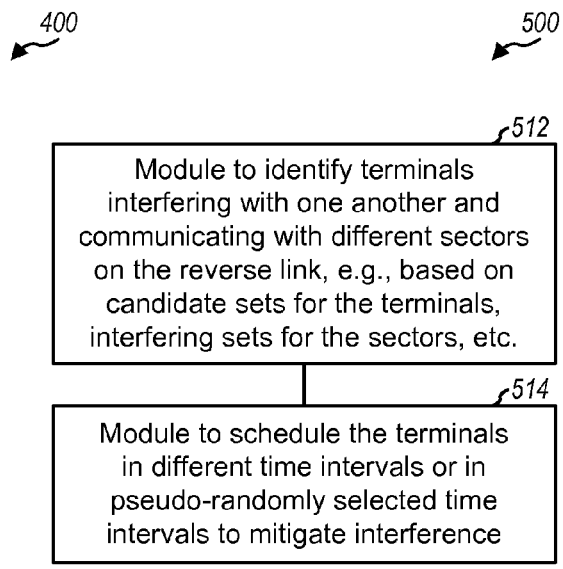
FIG. 5 shows an apparatus for scheduling terminals on the reverse link.

FIG. 5 shows a design of an apparatus 500 for scheduling terminals on the reverse link to mitigate interference. Apparatus 500 includes means for identifying terminals interfering with one another and communicating with different sectors on the reverse link (module 512), and means for scheduling the terminals in different time intervals or in pseudo-randomly selected time intervals to mitigate interference (module 514).

Figure 6:
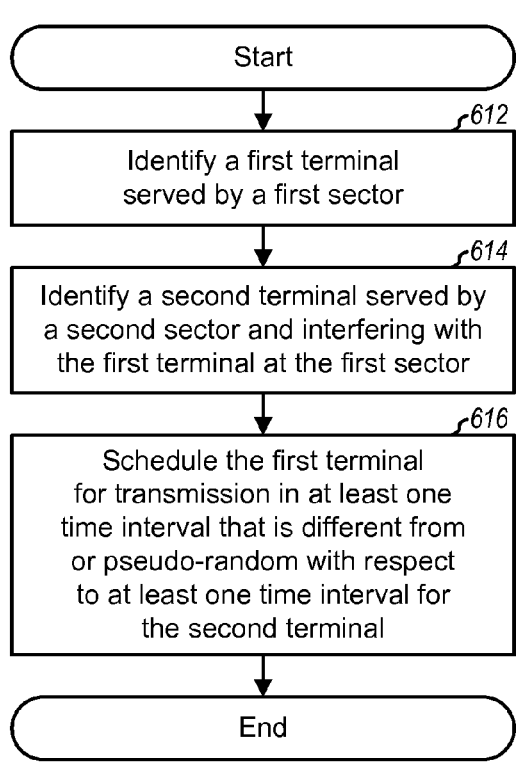
FIG. 6 shows another process for scheduling terminals on the reverse link.

FIG. 6 shows a design of a process 600 for scheduling terminals on the reverse link to mitigate interference. A first terminal served by a first sector may be identified (block 612).

A second terminal served by a second sector and interfering with the first terminal at the first sector may be identified (block 614). The second terminal may be identified by measurements made by the first sector, by information received from the second terminal and/or the second sector, etc. The first terminal may be scheduled for transmission in at least one time interval that is different from or pseudo-random with respect to at least one time interval for the second terminal (block 616).

A third terminal served by a third sector and interfering with the first terminal at the first sector may also be identified. The first terminal may be scheduled for transmission in at least one time interval that is different from or pseudo-random with respect to the time intervals for the second and third terminals. The second and third terminals may have candidate sets that include the first sector and may be identified as interfering with the first terminal based on the candidate sets. The second and third terminals may also be received at sufficient signal strength at the first sector and may be identified as interfering with the first terminal based on their received signal strength at the first sector.

For block 616, the first terminal may be mapped to a first interlace based on a mapping function. The first interlace may be unassignable to terminals communicating with the second sector. The first terminal may be remapped to a different interlace if the first interlace is an interlace assigned to the second terminal. The mapping function may be a hash function, which may receive an identifier for the first terminal and/or an identifier for the first sector and provide the first interlace for the first terminal.

Figure 7:
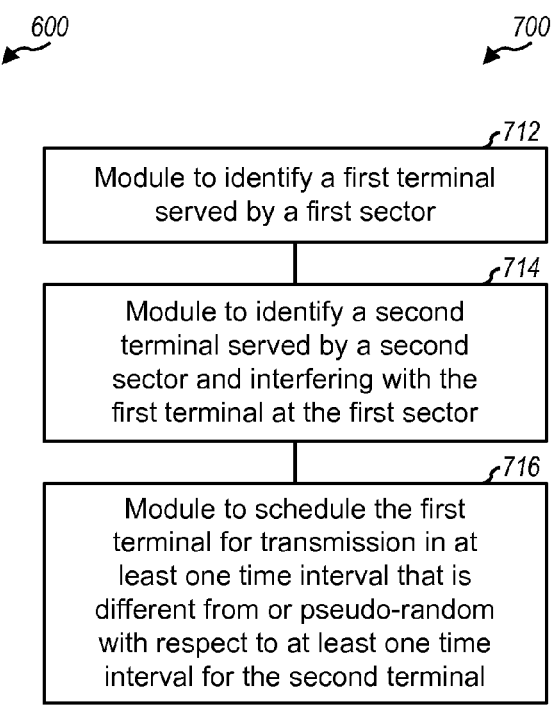
FIG. 7 shows another apparatus for scheduling terminals on the reverse link.

FIG. 7 shows a design of an apparatus 700 for scheduling terminals on the reverse link to mitigate interference. Apparatus 700 includes means for identifying a first terminal served by a first sector (module 712), means for identifying a second terminal served by a second sector and interfering with the first terminal at the first sector (module 714), and means for scheduling the first terminal for transmission in at least one time interval that is different from or pseudo-random with respect to at least one time interval for the second terminal (module 716).

FIG. 8 shows a design of a process 800 for scheduling terminals on the reverse link to mitigate interference. Terminals communicating with a sector on the reverse link may be identified (block 812). A set of interlaces assignable by the sector may be determined, with each interlace including evenly spaced time intervals (block 814). This set of interlaces may include (1) all interlaces usable for transmission on the reverse link, (2) different interlaces than at least one other set of interlaces for at least one neighbor sector, or (3) different number of interlaces than at least one other set of interlaces for at least one neighbor sector. The terminals may be mapped to interlaces in the set of interlaces based on a mapping function, which may map an identifier for a terminal, an identifier for a sector, and/or other input parameters to one or more interlaces for the terminal (block 816).

FIG. 9 shows a design of an apparatus 900 for scheduling terminals on the reverse link to mitigate interference. Apparatus 900 includes means for identifying terminals communicating with a sector on the reverse link (module 912), means for determining a set of interlaces assignable by the sector, with each interlace including evenly spaced time intervals (module 914), and means for mapping the terminals to interlaces in the set of interlaces based on a mapping function (module 916).

FIG. 10 shows a design of a process 1000 performed by a terminal for transmission on the reverse link. An assignment of at least one time interval for transmission by the terminal on the reverse link to a serving sector may be received (block 1012). The at least one time interval may be selected to mitigate interference to terminals in at least one neighbor sector. The at least one time interval may be selected based on a candidate set that includes the at least one neighbor sector. The at least one time interval may belong in an interlace that is not assignable to terminals communicating with the at least one neighbor sector. The terminal may transmit in the at least one time interval to the serving sector (block 1014).

FIG. 11 shows a design of an apparatus 1100 for transmission on the reverse link. Apparatus 1100 includes means for receiving an assignment of at least one time interval for transmission by a terminal on the reverse link to a serving sector, with the at least one time interval being selected to mitigate interference to terminals in at least one neighbor sector (module 1112), and means for transmitting in the at least one time interval to the serving sector (module 1114).

The modules in FIGS. 5, 7, 9 and 11 may comprise processors, electronics devices, hardware devices, electronics components, logical circuits, memories, etc., or any combination thereof.

Figure 12:
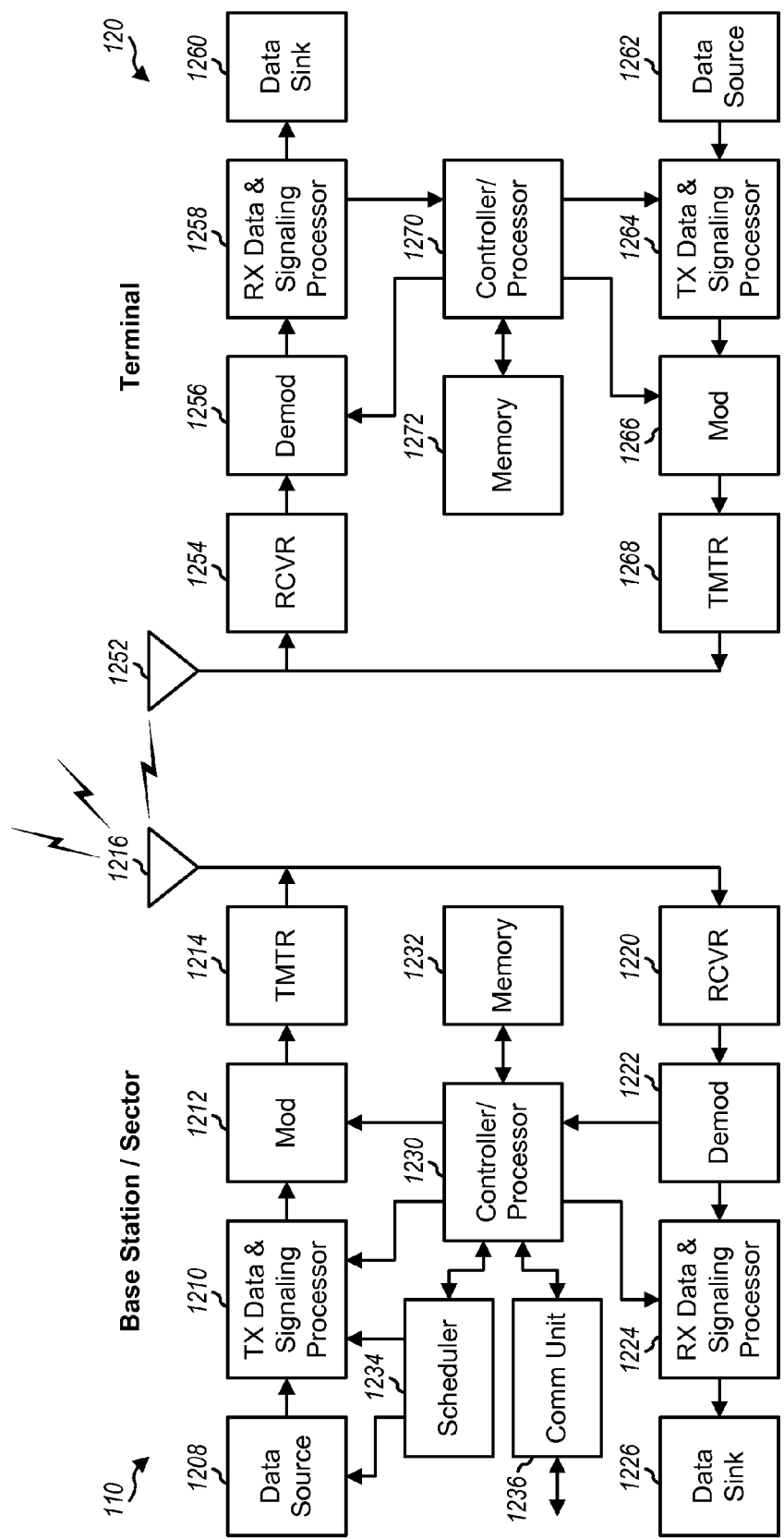
FIG. 12 shows a block diagram of a base station and a terminal.

FIG. 12 shows a block diagram of a design of a base station 110 for a sector and a terminal 120 in FIG. 1. In this design, base station 110 and terminal 120 are each equipped with a single antenna.

On the forward link, at base station 110, a transmit (TX) data and signaling processor 1210 receives traffic data for one or more terminals from a data source 1208, processes (e.g., formats, encodes, interleaves, and symbol maps) the traffic data for each terminal, and provides data symbols for all terminals. Processor 1210 also receives signaling (e.g., for the assigned frame interlaces) and generates signaling symbols. A modulator (Mod) 1212 performs modulation on the data symbols, signaling symbols, and pilot symbols (e.g., for OFDM, SC-FDM, CDMA, etc.) and provides output chips. A transmitter (TMTR) 1214 conditions (e.g., converts to analog, filters, amplifies, and upconverts) the output chips and generates a forward link signal, which is transmitted via an antenna 1216.

At terminal 120, an antenna 1252 receives forward link signals from base station 110 and possibly other base stations. A receiver (RCVR) 1254 processes (e.g., conditions and digitizes) the received signal from antenna 1252 and provides received samples. A demodulator (Demod) 1256 performs demodulation on the received samples (e.g., for OFDM, SC-FDM, CDMA, etc.) and provides symbol estimates. A receive (RX) data and signaling processor 1258 processes (e.g., symbol demaps, deinterleaves, and decodes) the symbol estimates and provides decoded data for terminal 120 to a data sink 1260 and signaling to a controller/processor 1270.

On the reverse link, at terminal 120, a TX data and signaling processor 1264 generates data symbols for traffic data from a data source 1262 and generates signaling symbols for signaling (e.g., active set, candidate set, etc.) to be sent to base station 110. A modulator 1266 performs modulation on the data symbols, signaling symbols, and pilot symbols and provides output chips. A transmitter 1268 conditions the output chips and generates a reverse link signal, which is transmitted via antenna 1252.

At base station 110, reverse link signals from terminal 120 and other terminals are received by antenna 1216, conditioned and digitized by a receiver 1220, demodulated by a demodulator 1222, and processed by an RX data and signaling processor 1224 to recover the traffic data and signaling sent by terminal 120 and other terminals.

Controllers/processors 1230 and 1270 direct the operation of various processing units at base station 110 and terminal 120, respectively. Memories 1232 and 1272 store program codes and data for base station 110 and terminal 120, respectively. A communication (Comm) unit 1236 supports communication between base station 110 and other network entities via the backhaul, e.g., to exchange set information, scheduling information, etc. A scheduler 1234 receives information (e.g., for active sets, candidate sets, etc.) from the terminals and/or information (e.g., for user sets, interfering sets, etc.) from other base stations via communication unit 1236. Scheduler 1234 schedules the terminals served by base station 110 for transmission on the forward and reverse links. Scheduler 1234 and/or controllers/processors 1230 may implement process 400 in FIG. 4, process 600 in FIG. 6, process 800 in FIG. 8, and/or other processes for the techniques described herein. Controllers/processors 1270 may implement process 1000 in FIG. 10 and/or other processes for the techniques described herein.

The techniques described herein may be implemented by various means. For example, these techniques may be implemented in hardware, firmware, software, or a combination thereof. For a hardware implementation, the processing units used to perform the techniques at an entity (e.g., a base station or a terminal) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software instructions may be stored in a memory (e.g., memory 1232 or 1272 in FIG. 12) and executed by a processor (e.g., processor 1230 or 1270). The memory may be implemented within the processor or external to the processor. The firmware and/or software instructions may also be stored in other processor-readable medium such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus comprising:
   at least one processor configured to identify terminals interfering with one another and communicating with different sectors on the reverse link, and to schedule the identified terminals in different time intervals or in pseudo-randomly selected time intervals to mitigate the interference;
   a memory coupled to the at least one processor;
   wherein the at least one processor is configured to identify the terminals interfering with one another based on candidate sets for the terminals, the candidate set for each terminal comprising sectors that received a respective signal from the terminal having a received signal strength that crossed a threshold.

2. The apparatus of claim 1, wherein the at least one processor is configured to identify the terminals interfering with one another based on interfering sets for the sectors, the interfering set for each sector comprising terminals that each transmitted a respective signal received by the sector having a respective received signal strength that crossed a threshold, but communicating with other sectors.

3. The apparatus of claim 1, wherein the at least one processor is configured to schedule each of the terminals interfering with one another on a different set of at least one time interval.

4. The apparatus of claim 1, wherein the at least one processor is configured to schedule the terminals interfering with one another on different interlaces, each interlace including evenly spaced time intervals.

5. The apparatus of claim 1, wherein the at least one processor is configured to receive, via backhaul signaling from the sectors, information identifying the terminals interfering with one another from the sectors.

6. A method comprising:
   identifying terminals interfering with one another based on candidate sets for the terminals and communicating with different sectors on the reverse link, the candidate set for each terminal comprising sectors that received a respective signal from the terminal having a received signal strength that crossed a threshold; and
   scheduling the identified terminals in different time intervals or in pseudo-randomly selected time intervals to mitigate interference.

7. The method of claim 6, wherein scheduling the terminals in different time intervals comprises:
   scheduling the terminals interfering with one another on different interlaces, each interlace including evenly spaced time intervals.

8. An apparatus comprising:
   at least one processor configured to identify a first terminal served by a first sector, to identify a second terminal served by a second sector and interfering with the first terminal at the first sector, and to schedule the first terminal for transmission in at least one time interval that is different from or pseudo-random with respect to at least one time interval for the second terminal; and
   a memory coupled to the at least one processor
   wherein the at least one processor is configured to identify the terminals interfering with one another based on candidate sets for the terminals, the candidate set for each terminal comprising sectors that received a respective signal from the terminal having a received signal strength that crossed a threshold.

9. The apparatus of claim 8, wherein the at least one processor is configured to identify a third terminal served by a third sector and interfering with the first terminal at the first sector, and to schedule the first terminal for transmission in at least one time interval that is different from or pseudo-random with respect to time intervals for the second and third terminals.

10. The apparatus of claim 8, wherein the second terminal has a candidate set that includes the first sector and the at least one processor is configured to identify the second terminal as interfering with the first terminal based on the candidate set.

11. The apparatus of claim 8, wherein the at least one processor is configured to receive a signal from the second terminal having a received signal strength at the first sector and is configured to identify the signal as interfering with the first terminal when the received signal strength of the second terminal at the first sector crosses a threshold.

12. The apparatus of claim 8, wherein the at least one processor is configured to receive, via backhaul signaling from the second sector, information identifying the second terminal.

13. The apparatus of claim 8, wherein the at least one processor is configured to map the first terminal to an interlace not assignable to terminals communicating with the second sector, the interlace including the at least one time interval for the first terminal.

14. The apparatus of claim 8, wherein the at least one processor is configured to map the first terminal to a first interlace based on a mapping function, the first interlace including the at least one time interval for the first terminal.

15. The apparatus of claim 14, wherein the at least one processor is configured to remap the first terminal to a different interlace if the first interlace includes the at least one time interval for the second terminal.

16. The apparatus of claim 14, wherein the mapping function is a hash function.

17. The apparatus of claim 14, wherein the mapping function receives an identifier for the first terminal and, based at least in part on the identifier, provides the first interlace for the first terminal.

18. The apparatus of claim 14, wherein the mapping function receives an identifier for the first terminal and an identifier for the first sector and, based at least in part on the identifier for the first terminal and the identifier for the first sector, provides the first interlace for the first terminal.

19. A method comprising:
  identifying a first terminal served by a first sector;
  identifying a second terminal served by a second sector and interfering with the first terminal at the first sector;
  wherein the interfering terminals are identified based on candidate sets for the terminals, the candidate set for each terminal comprising sectors that received a respective signal from the terminal having a received signal strength that crossed a threshold; and
  scheduling the first terminal for transmission in at least one time interval that is different from or pseudo-random with respect to at least one time interval for the second terminal.

20. The method of claim 19, wherein identifying the second terminal comprises:
  receiving a signal from the second terminal having a received signal strength at the first sector, and
  identifying the second terminal as interfering with the first terminal when the received signal strength of the second terminal at the first sector crosses a threshold.

21. The method of claim 19, wherein the scheduling the first terminal comprises:
  mapping the first terminal to an interlace based on a mapping function, the interlace including the at least one time interval for the first terminal.

22. The method of claim 19, wherein the scheduling the first terminal comprises:
  mapping the first terminal to an interlace not assignable to terminals communicating with the second sector, the interlace including the at least one time interval for the first terminal.

23. The method of claim 19, further comprising:
  assigning a first sector set of time intervals from a given plurality of time intervals as assignable by the first sector; and
  assigning a second sector set of time intervals from the given plurality of time intervals as assignable by the second sector,
  wherein scheduling the first terminal for transmission in at least one time interval that is different from or pseudo-random with respect to at least one time interval for the second terminal includes the at least one time interval for the transmission being in the first set concurrent with being not in the second set.

24. An apparatus comprising:
  means for identifying a first terminal served by a first sector;
  means for identifying a second terminal served by a second sector and interfering with the first terminal at the first sector, wherein the interfering terminals are identified based on candidate sets for the terminals, the candidate set for each terminal comprising sectors that received a respective signal from the terminal having a received signal strength that crossed a threshold; and
  means for scheduling the first terminal for transmission in at least one time interval that is different from or pseudo-random with respect to at least one time interval for the second terminal.

25. The apparatus of claim 24, wherein the means for identifying the second terminal comprises:
  means for receiving a signal from the second terminal at the first sector;
  means for measuring the signal strength of a received signal; and
  means for identifying the second terminal as interfering with the first terminal when the received signal strength of the second terminal at the first sector crosses a threshold.

26. An apparatus comprising:
  a controller configured to execute code; and
  non-transitory computer readable memory storing code that when executed by the controller is configured to:
    identify terminals interfering with one another and communicating with different sectors on the reverse link; and
    schedule the identified terminals in different time intervals or in pseudo-randomly selected time intervals to mitigate the interference
  wherein the non-transitory computer readable memory further stores code that when executed by the controller is configured to identify the terminals interfering with one another based on candidate sets for the terminals, the candidate set for each terminal comprising sectors that received a signal from the terminal having a received signal strength that crosses a threshold.

27. The apparatus of claim 26, wherein the non-transitory computer readable memory further stores code that when executed by the controller is configured to determine one or more candidate sets.

28. The apparatus of claim 26, wherein the non-transitory computer readable memory further stores code that when executed by the controller is configured to identify the terminals interfering with one another based on interfering sets for the sectors, the interfering set for each sector comprising terminals that each transmitted a respective signal received by the sector having a received signal strength that crosses a threshold, but communicating with other sectors.

29. The apparatus of claim 28, wherein the non-transitory computer readable memory further stores code that when executed by the controller is configured to determine one or more interfering sets.

* * * * *